(12) United States Patent
Watts et al.

(10) Patent No.: US 10,721,173 B2
(45) Date of Patent: Jul. 21, 2020

(54) CREDIT DISTRIBUTION TO CLIENTS

(71) Applicant: HEWLETT PACKARD ENTERPRISE DEVELOPMENT LP, Houston, TX (US)

(72) Inventors: Jonathan M. Watts, Roseville, CA (US); Jonathan Michael Seely, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 493 days.

(21) Appl. No.: 15/301,002

(22) PCT Filed: Mar. 31, 2014

(86) PCT No.: PCT/US2014/032429
§ 371 (c)(1),
(2) Date: Sep. 30, 2016

(87) PCT Pub. No.: WO2015/152891
PCT Pub. Date: Oct. 8, 2015

(65) Prior Publication Data
US 2017/0034068 A1    Feb. 2, 2017

(51) Int. Cl.
*H04L 12/801* (2013.01)
*H04L 12/64* (2006.01)
*H04L 12/873* (2013.01)

(52) U.S. Cl.
CPC .......... *H04L 47/39* (2013.01); *H04L 12/6418* (2013.01); *H04L 47/52* (2013.01)

(58) Field of Classification Search
CPC ...... H04L 47/39; H04L 47/52; H04L 12/6418
See application file for complete search history.

(56) References Cited

U.S. PATENT DOCUMENTS

| | | | |
|---|---|---|---|
| 6,016,316 A | 1/2000 | Moura et al. | |
| 6,801,500 B1 * | 10/2004 | Chandran | H04L 12/5602 370/230.1 |
| 7,324,452 B2 | 1/2008 | Xu et al. | |
| 7,324,554 B1 | 1/2008 | Ginjpalli et al. | |

(Continued)

FOREIGN PATENT DOCUMENTS

EP    2608627 A1 *    6/2013    ........ H04W 72/0486

OTHER PUBLICATIONS

Li, Kang, Shar, Molly, Walpole, Jonathan, Pu, Calton, "Modeling the Transient Rate Behavior of Bandwidth Sharing as a Hybrid Control System;" Jan. 2001, https://digitalcommons.ohsu.edu/cgi/viewcontent.cgi?article=1043&context=csetech.*

(Continued)

*Primary Examiner* — John A Follansbee
*Assistant Examiner* — Lam T Do (57) ABSTRACT

A plurality of work requests may be received from a plurality of clients. A plurality of credits may be distributed among the plurality of clients. The plurality of credits may be distributed in response to a refreshed credit cycle. At least one of the work requests to be processed may be selected based on an amount of the credits available for the clients. An amount of credits to distribute to the clients may be determined in response to the refreshed credit cycle based on an amount of the credits used to process the at least one work request during a last credit cycle compared to a system credit capacity of the system.

20 Claims, 4 Drawing Sheets

(56) References Cited

U.S. PATENT DOCUMENTS

| | | | |
|---|---|---|---|
| 8,347,302 B1* | 1/2013 | Vincent | G06F 9/4881 |
| | | | 718/103 |
| 8,570,916 B1 | 10/2013 | Tang et al. | |
| 2003/0231593 A1* | 12/2003 | Bauman | H04L 29/06 |
| | | | 370/235 |
| 2004/0042399 A1 | 3/2004 | Bly et al. | |
| 2004/0153545 A1* | 8/2004 | Pandya | H04L 29/06 |
| | | | 709/226 |
| 2005/0254519 A1 | 11/2005 | Beukema et al. | |
| 2008/0126547 A1* | 5/2008 | Waldspurger | G06F 9/4881 |
| | | | 709/226 |
| 2012/0307765 A1 | 12/2012 | Chakrabarti et al. | |
| 2013/0242742 A1 | 9/2013 | Nishimura | |
| 2013/0336319 A1 | 12/2013 | Liu et al. | |
| 2015/0094017 A1* | 4/2015 | Guionnet | H04M 15/723 |
| | | | 455/405 |

OTHER PUBLICATIONS

Abhinav Kamra et al., "Fair Adaptive Bandwidth Allocation: A Rate Control Based Active Queue Management Discipline," Computer Networks, Received: Jul. 7, 2003, Published: 2004, pp. 135-152, No. 44, Elsevier B.V.

International Search Report and Written Opinion, International Application No. PCT/US2014/032429, dated Dec. 17, 2014, pp. 1-11, KIPO.

* cited by examiner

CREDIT DISTRIBUTION TO CLIENTS

BACKGROUND

Certain devices or systems may distribute credits among a plurality of clients. Each of the credits may be used by clients to use a discrete amount of a shared resource, such as bandwidth. Manufacturers, administrators and/or vendors, may be challenged to improve allocation or use of the credits among the clients.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Fixed credit based systems may be used to allow for fair sharing of a resource among clients, such as where there is more bandwidth at a front-plane than a back-plane of a network switch. However, fixed credit based systems may not compensate the allocation of the credits for clients that are inactive or transient system conditions that lead to excessive credits being distributed to at least some of the clients.

For example, clients may be given a fixed amount of credits at a fixed time interval. If the system can move at 100% efficiency but only 80% of the clients are active, then this may leave a portion of credits in the system ungoverned by credit arbitration logic. This may in turn lead to unfair servicing and excessive credit depletion. Additionally, during periods of less than 100% efficiency, the credit based system may distribute more credit than the system can move, which may lead to credit build up and/or unfair arbitration.

Examples may improve a quality of service by improving management of credit distribution and reducing undesired conditions that cause unfair arbitration, such as excessive or insufficient credit levels. An example system may include an arbitration unit, a credit accounting unit and a credit timer. The arbitration unit may receive a plurality of work requests from a plurality of clients. The credit accounting unit may distribute a plurality of credits among the plurality of clients. The credit timer may refresh the credit cycle. The credit accounting unit may distribute the plurality of credits in response to the refreshed credit cycle. The credit accounting unit may determine an amount of credits to distribute to the clients in response to the refreshed credit cycle based on an amount of the credits used to process any work requests during a last credit cycle compared to a system credit capacity of the system.

When clients in the example system are all above or below a threshold number of credits, the credit system may correct to regulate the distribution of service, unlike current credit systems. For example, the clients' credit may remain around the stable point in examples by fairly arbitrating or choosing the next client to service. However, in current systems, where only a portion of the clients are active, those clients may relatively quickly run out of credit and an arbitration unit may have a period of time in which it has no credit indication to grant next of service fairly. Thus, examples may improve client arbitration fairness in a credit based system where credit capacity is indeterminate by not allocating more credit than the system can move. This may be achieved by making credit cycle adjustments based on idle credit bandwidth and credit availability, as explained below.

Figure 1:
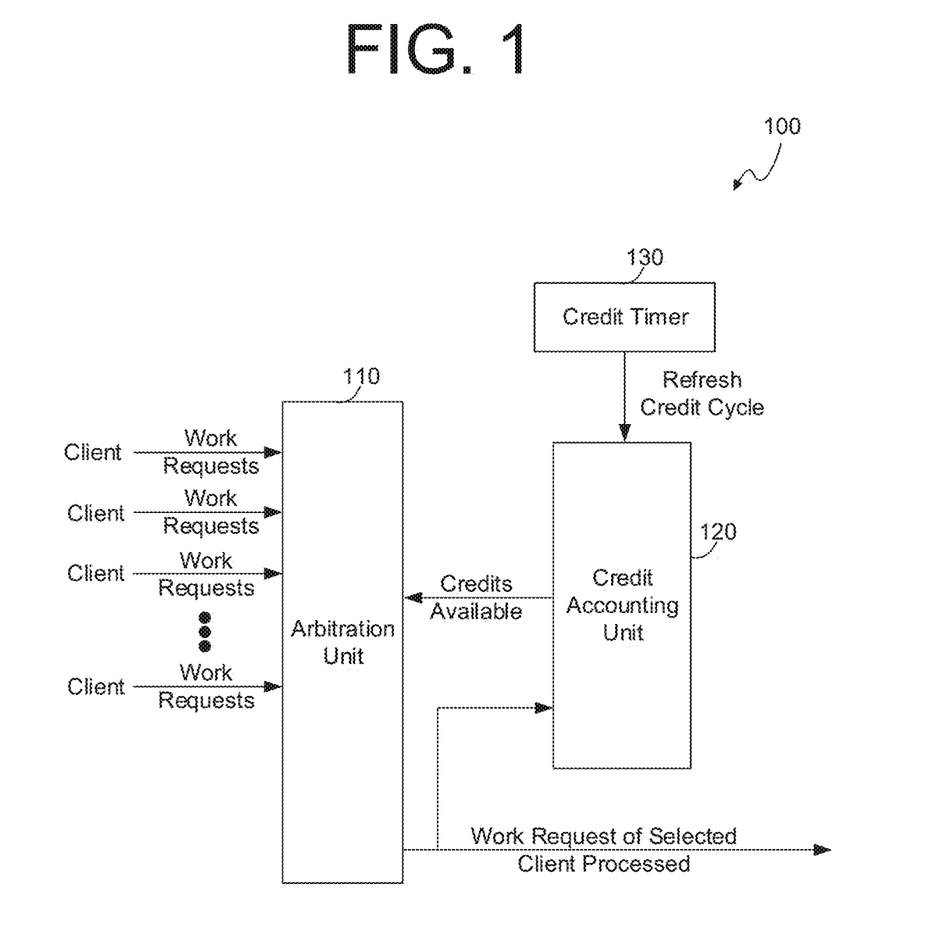
FIG. 1 is an example block diagram of a system to distribute credits among clients.

Referring now to drawings, FIG. 1 is an example block diagram of a system 100 to distribute credits among clients. The system 100 may include any type of device to transmit and receive data, such as a network switch, Ethernet switch, server, hub, network element, data link layer switch, and/or or any type system to having a finite capacity of a resource.

The system 100 is shown to include an arbitration unit 110, a credit accounting unit 120 and a credit timer 130. The arbitration unit 110, credit accounting unit 120 and credit timer 130 may include, for example, a hardware device including electronic circuitry for implementing the functionality described below, such as control logic and/or memory. In addition or as an alternative, the arbitration unit 110, credit accounting unit 120 and credit timer 130 may be implemented as a series of instructions encoded on a machine-readable storage medium and executable by a processor.

The arbitration unit 110 may receive a plurality of work requests from a plurality of clients. The credit timer 130 may refresh the credit cycle. The credit accounting unit 120 may distribute the plurality of credits among the plurality of clients in response to the refreshed credit cycle.

The arbitration unit 110 may select any work requests to be processed based on an amount of the credits available for the clients. The credit accounting unit 110 may determine an amount of credits to distribute to the clients in response to the refreshed credit cycle based on an amount of the credits used to process any work request during a last credit cycle compared to a system credit capacity of the system. For example, the credit accounting unit 120 may determine a number of credits each work request costs to process based on the size of the work request. The number of credits used may be a sum of the costs of all the work requests processed during the credit cycle. The system 100 is explained in further detail below with respect to FIG. 2.

Figure 2:
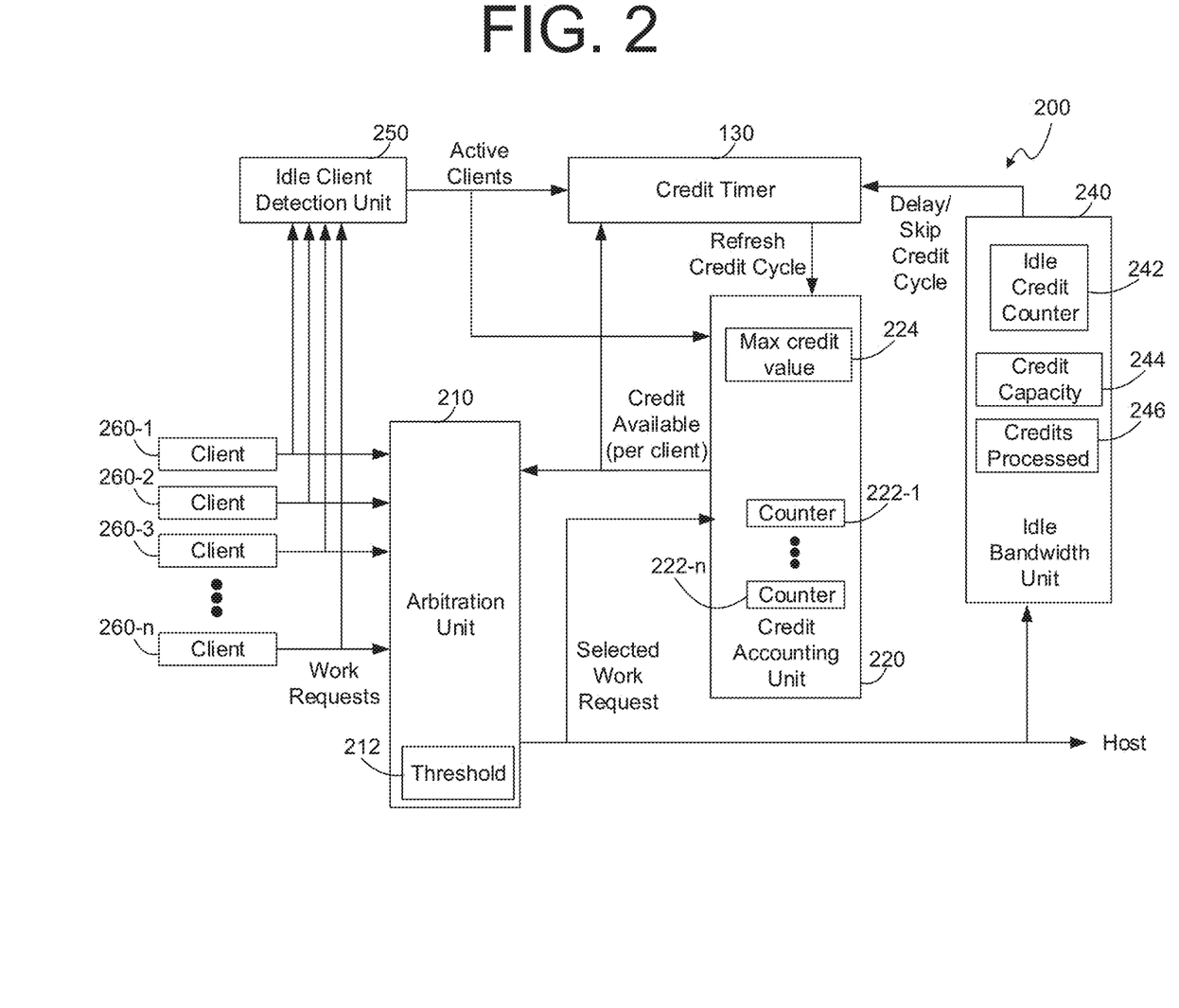
FIG. 2 is another example block diagram of a system to distribute credits among clients.

FIG. 2 is another example block diagram of a system 200 to distribute credits among clients. The system 200 may include any type of device to transmit and receive data, such as a network switch, Ethernet switch, server, hub, network element, data link layer switch, and/or or any type system to having a finite capacity of a resource.

The system 200 of FIG. 2 may include at least the functionality and/or hardware of the system 100 of FIG. 1. For example, the system 200 includes the arbitration unit 210, a credit accounting unit 220 and the credit timer 130. The system 200 further includes an idle bandwidth unit 240 and an idle client detection unit 250. The credit accounting unit 220 of FIG. 2 may include at least the functionality and/or hardware of the credit accounting unit 120 of FIG. 1.

The idle bandwidth and idle client detection units 240 and 250 may include, for example, a hardware device including electronic circuitry for implementing the functionality described below, such as control logic and/or memory. In addition or as an alternative, the idle bandwidth and idle client detection units 240 and 250 may be implemented as a series of instructions encoded on a machine-readable storage medium and executable by a processor.

The system 200 may relate to arbitration based on clients 260 having available credit. The credit may be distributed at fixed time intervals, e.g. credit cycles. The amount of credit distributed among all of the clients 260 may be equal to the capacity of the system 200 between the credit cycles. As noted above, the credit timer 130 may periodically assert to the credit accounting unit 220 when to refresh the credit cycle. For instance, the credit timer 130 may count down from a fixed time, and assert that the credit cycle is to be refreshed when the countdown reaches zero. This fixed time may be determined experimentally or based on specifications to be large enough to not burden the system 200 with excessive credit updates yet small enough to reduce a likelihood of excessive bursting of work units from an individual client 260.

Then, the credit timer 130 may reset to the fixed time and begin counting down again. The idle credit detection unit 250 may determine which of a plurality of clients 260-1 to 260-n, where n is a natural number, is active. For instance, as shown in FIG. 2, the idle credit detection unit 250 may monitor whether any of the clients 260-1 to 260-n are sending work requests to the arbitration unit 210. The idle credit detection unit 250 may indicate the active clients to the credit timer 130 and the credit accounting unit 220.

The credit accounting unit 220 may only distribute credits to the active clients 260 in response to refreshed credit cycle. Thus, the credit accounting unit 220 may not distribute any the plurality of credits to non-active clients 260 of the plurality of clients 260-1 to 260-n, in response to the refreshed credit cycle. The credit accounting unit 220 may compare the amount of the credits processed 228 during a last credit cycle to a system credit capacity 226 of the system 200 to determine the amount of credits to distribute to the active clients 260 in response to the refreshed credit cycle.

The arbitration unit 210 may only select the active clients 260 having a threshold number 212 of the credits. The threshold number 212 may be determined experimentally and/or based on preference. In one instance, the threshold number 212 may be set to zero. The arbitration unit 210 may use any type of scheduling algorithm to select from the works requests of the active clients 260 having the positive amount of credits, such as preemptive scheduling, round-robin, first in first out, shortest remaining time, multilevel queue scheduling and the like. Each of the clients 260 may interface with the arbitration unit 210 via a separate port. In one example, an amount of the plurality of credits distributed to each of the active clients 260 may be based on bandwidths of the ports of the active clients 260.

An amount of the plurality of credits distributed among the plurality of clients 260-1 to 260-n may relate to the system capacity 226 between intervals of the credit cycle. The credit accounting unit 220 may include a plurality of counters 222-1 to 222-n, each of the counters 222 may correspond to one of the plurality of clients 260-1 to 260-n.

The credit accounting unit 220 may increment the counters 222 of the active clients 260, in response to the refreshed credit cycle. The credit accounting unit 220 may output the distributed credits to the arbitration unit 210 in response to the refreshed credit cycle as well as to the credit timer 130 for reasons explained below. The credit accounting unit 220 may subtract an amount of the credits from the counter 222 corresponding to the selected client 260 based on a size of the work request processed for the selected client 260 via the system processing pipe 250.

For example, if the counter 222 of the active client 260 had 60 credits and the work request of the active client 260 cost 20 credits, the new value of the counter 222 of the active client 260 may be 40 credits. Further, after the refresh cycle, more credits may be added to the counter 222 of the active client 260 after the refresh cycle. Multiple clients and/or work requests may be processed between refresh cycles, such as by forwarding data at the data link layer (layer 2).

At least one of the counters 222 corresponding to one of the clients 260 may not be updated if the corresponding counter 260 reaches a maximum credit value 224. In one example, the credit accounting unit 220 may initially distribute the plurality of credits evenly among the plurality of clients 260-1 to 260-n. The system 200 may monitor, through the idle bandwidth unit 240, the amount of idle credit moving through the system in order to determine when to mask a fixed rate credit cycle from occurring. The idle bandwidth monitor 240 may monitor an amount of the plurality of credits distributed between all of the clients 260-1 to 260-n that are not processed during the refreshed credit cycle. Further, the idle bandwidth monitor 240 may cause the refresh cycle to be skipped or delayed based on a number of the unprocessed credits.

For example, just prior to a credit cycle, the idle bandwidth monitor 240 may add a difference between the credits processed 228 for the work requests and a system credit capacity of the system 244 to an idle credit counter 242, if the number of the credits processed 246 is less than the system credit capacity 244. For example, the idle bandwidth monitor 240 may subtract the amount of credit that was processed 228 from the amount of credit 244 the system 200 can physically move during a time interval (system credit rate/capacity). If the remaining value is positive, then the system 200 may have moved less than 100% of credit and the remaining value may be added into the idle credit counter 242. If the remaining value is negative, then the system 200 may be over 100% utilized.

The surplus credit may indicate that there is additional work queued up in the system 200 that will carry over into the next credit cycle. The surplus credit may be preserved and used in the next credit cycle accounting as credit processed 246 by the credit accounting unit 220. For instance, the credit accounting unit 220 may subtract the above calculated difference from the plurality of credits to be processed for the next credit cycle.

At the start of a credit cycle, the "idle credit" count of the idle credit counter 242 may be compared to the system credit capacity 226. The credit accounting unit 220 may skip the next credit cycle, if a value of the idle credit counter 242 exceeds the system credit capacity 226. For example, in this case, the idle bandwidth unit 240 may signal to the credit timer 130 to skip/delay the next credit cycle. The idle bandwidth monitor 240 may also decrement the idle credit counter 242 by the amount of the system credit capacity 226, if the value of the idle credit counter 242 exceeds the system credit capacity 226.

This operation may ensure that the system 200 is only distributing credits to the clients 260 when the system 200 is actively moving traffic. For example, if the system 200 was continuously running at 100% of the system credit capacity 226, then the amount of idle credit would be 0 and the credit cycles would never be skipped. If the system 200 was completely idle, then the idle credit would always be 100% of the system credit capacity 226 and the system 200 would continuously skip the credit cycles. Additionally, if the system 200 was running at 50% of the system credit capacity 226, the system 200 would only build up enough idle credit to skip every other credit cycle.

As noted above, the system 200 may monitor the clients 260 that are actively using credits, such as through the idle client detection unit 250. If all of active clients are below the threshold number 212 of credits 260, meaning that there is unutilized credit in the system 200 (distributed to at least one inactive client 260), the credit timer 130 may prematurely generate the credit cycle to distribute credits. Issuing the credit cycle may cause at least some of the active clients 260 to be above the threshold number 212 of credits where the system arbitration can fairly service clients with credits. Thus, the credit timer 130 may trigger the next credit cycle before a fixed time interval if all of the active clients 260 are below the threshold number 212 of credits.

In addition, to prevent too many credits from getting distributed back into the system, a credit cycle will be skipped if all active clients are above the threshold number 212 of credits. This will improve the time it takes for the system to stabilize to a point where the arbitration system 200 can enforce fair service. Thus, the credit timer 130 may skip the next credit cycle, if all of the active clients 260 are above the threshold number 212 of credits.

Figure 3:
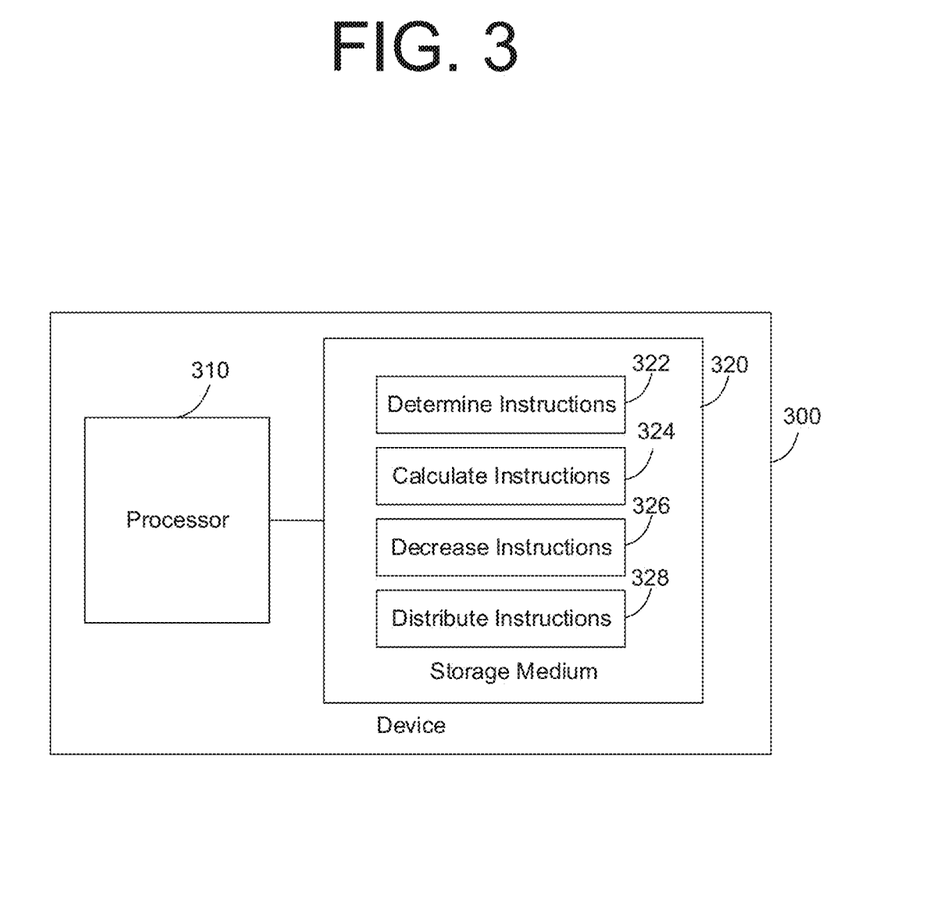
FIG. 3 is an example block diagram of a computing device including instructions for allocating credits among clients.

FIG. 3 is an example block diagram of a computing device 300 including instructions for allocating credits among clients. In the embodiment of FIG. 3, the computing device 300 includes a processor 310 and a machine-readable storage medium 320. The machine-readable storage medium 320 further includes instructions 322, 324, 326 and 328 for allocating credits among clients.

The computing device 300 may be, for example, a secure microprocessor, a notebook computer, a desktop computer, an all-in-one system, a server, a network device such as a switch or server, a controller, a wireless device, or any other type of device capable of executing the instructions 322, 324, 326 and 328. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 322, 324, 326 and 328 to implement allocating credits among clients. As an alternative or in addition to retrieving and executing instructions, the processor 310 may include at least one integrated circuit (IC), other control logic, other electronic circuits, or combinations thereof that include a number of electronic components for performing the functionality of instructions 322, 324, 326 and 328.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for allocating credits among clients.

Figure 4:
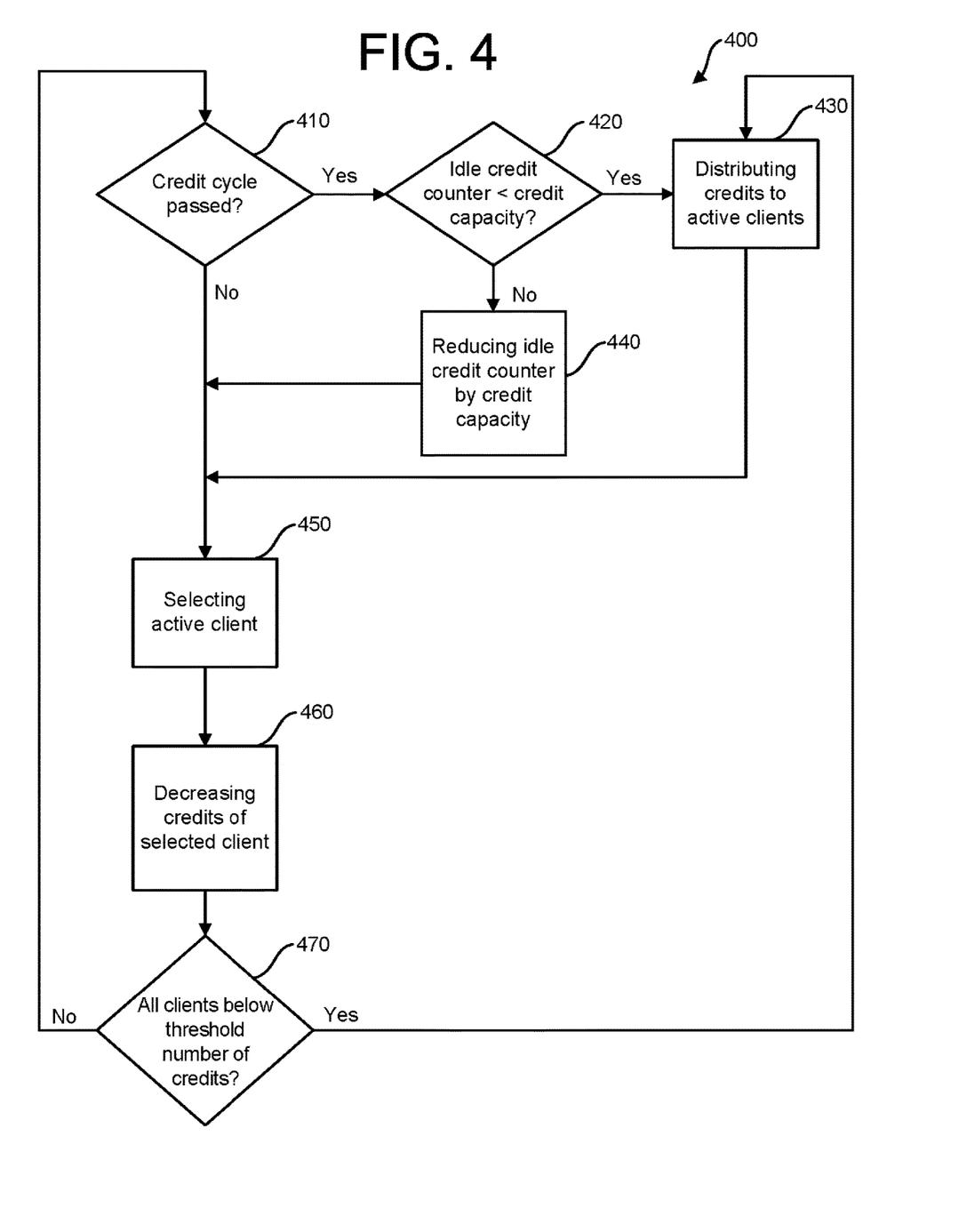
FIG. 4 is an example flowchart of a method for allocating credits among clients.

Moreover, the instructions 322, 324, 326 and 328 when executed by a processor (e.g., via one processing element or multiple processing elements of the processor) can cause the processor to perform processes, such as, the process of FIG. 4. For example, the determine instructions 322 may be executed by the processor 310 determine which of a plurality of clients are active in sending work requests to a network switch.

The calculate instructions 324 may be executed by the processor 310 to calculate a number of credits to distribute to each of the active clients. Each of the credits may correspond to a work unit and a size of the work request may correspond to at least one work unit. The decrease instructions 326 may be executed by the processor 310 to decrease a total number of the credits distributed to the active client having the work request processed based on the size of the processed work request. The distribute instructions 328 may be executed by the processor 310 to distribute more credits to the active clients at a next credit cycle based on a comparison of the system credit capacity of the system 300 to a number of the credits used by the plurality of clients over at least one previous credit cycle.

FIG. 4 is an example flowchart of a method 400 for allocating credits among clients. Although execution of the method 400 is described below with reference to the system 200, other suitable components for execution of the method 400 may be utilized, such as the system 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the system 200 determines if the credit cycle has passed or expired. If the credit cycle has passed, at block 420, the system 200 determines if the idle credit counter 242 is less than the system credit capacity 244. If the idle credit counter 242 is less than the system credit capacity 244, at block 430, the system 200 distributes credits to each of the active clients 260. The idle credit counter 242 may be incremented based on unprocessed credits 246. The method 400 then flows from block 430 to block 450.

However, if the idle credit counter 242 is greater than or equal to the system credit capacity 244, the method 400 flows from block 420 to block 440. Then, at block 440, the system reduces the idle credit counter 242 by the system credit capacity 244. Next, the method 400 flows from block 440 to block 450. Further, if the credit cycle has not passed, the method 400 flows from block 410 to block at block 450. At block 450, the system 200 selects at least one active client 260 from a plurality of clients 260-1 to 260-n. At block 460, the system 200 reduces an amount of credits distributed to the selected client 260 by a size of a work request processed of the selected client 260. At block 470, the system 200 determines if all of the clients 260-1 to 260-n are below the threshold number 212 of credits. If all of the clients 260-1 to 260-n are below the threshold number 212 of credits, the method 400 flows back to block 410. Otherwise, if at least one of the clients 260-1 to 260-n is greater than or equal to the threshold number 212 of credits, the method 400 flows back to block 430.

The amount of credits distributed over a plurality of credit cycles may vary based on a number of the credits used during at least one previous credit cycle. The credit cycle may be refreshed before a fixed time interval if all of the active clients 260 have less than the threshold number of credits. The credit cycle may be delayed by more than the fixed time interval, if a threshold number of the distributed credits are not used by the plurality of clients 260 over at least one of the credit cycles.

We claim:

1. A system comprising:
 a computer processor; and
 a memory comprising instructions executable by the computer processor to:
 determine whether to refresh a credit cycle for bandwidth on a network based on a plurality of bandwidth credit balances corresponding to a plurality of bandwidth clients of the network, wherein the credit cycle is refreshed if each of the bandwidth credit balances is less than a lower cycle threshold;
 in response to determining that an amount of unused bandwidth credit in the current credit cycle is greater than a bandwidth capacity of the network, skip the refresh of the credit cycle;
 select one or more active clients of the bandwidth clients, wherein the active clients comprise one or more of the bandwidth clients that use an amount of bandwidth credit in a current credit cycle that exceeds a lower client threshold; and
 distribute one or more bandwidth credit amounts to the active clients in response to the credit cycle being refreshed.

2. The system of claim 1, wherein the instructions are executable by the computer processor to determine whether to skip the credit cycle based on the bandwidth credit balances, wherein the credit cycle is skipped if each of the bandwidth credit balances is greater than an upper cycle threshold.

3. The system of claim 1, wherein the instructions are executable by the computer processor to determine whether to skip the credit cycle based on the amount of unused bandwidth credit in the current credit cycle and the bandwidth capacity of the network.

4. The system of claim 3, wherein the instructions are executable by the computer processor to determine a sum of the amount of unused bandwidth credit in the current credit cycle and an amount of unused bandwidth in one or more previous credit cycles, and wherein the credit cycle is skipped if the sum is greater than the bandwidth capacity of the network.

5. The system of claim 1, wherein the instructions are executable by the computer processor to determine whether to skip the credit cycle based on a total bandwidth credit used by the bandwidth clients in the current credit cycle, and wherein the credit cycle is skipped if the total bandwidth credit used by the bandwidth clients in the current credit cycle is less than the lower cycle threshold.

6. The system of claim 1, wherein the bandwidth credit amounts are distributed by adding the bandwidth credit amounts to the bandwidth credit balances for the active clients.

7. The system of claim 1, wherein the bandwidth credit amounts are equal to zero for the active clients having the bandwidth credit balances greater than an upper client threshold.

8. A method, comprising:
 determining whether to refresh a credit cycle for bandwidth on a network based on a plurality of bandwidth credit balances corresponding to a plurality of bandwidth clients of the network, wherein the credit cycle is refreshed if each of the bandwidth credit balances is less than a lower cycle threshold;
 in response to determining that an amount of unused bandwidth credit in the current credit cycle is greater than a bandwidth capacity of the network, skipping the refresh of the credit cycle;
 selecting one or more active clients of the bandwidth clients, wherein the active clients comprise one or more of the bandwidth clients that use an amount of bandwidth credit in a current credit cycle that exceeds a lower client threshold; and
 distributing one or more bandwidth credit amounts to the active clients in response to the credit cycle being refreshed.

9. The method of claim 8, comprising determining whether to skip the credit cycle based on the bandwidth credit balances, wherein the credit cycle is skipped if each of the bandwidth credit balances is greater than an upper cycle threshold.

10. The method of claim 8, comprising determining whether to skip the credit cycle based on the amount of unused bandwidth credit in the current credit cycle and the bandwidth capacity of the network.

11. The method of claim 10, comprising determining a sum of the amount of unused bandwidth credit in the current credit cycle and an amount of unused bandwidth in one or more previous credit cycles, and wherein the credit cycle is skipped if the sum is greater than the bandwidth capacity of the network.

12. The method of claim 8, comprising determining whether to skip the credit cycle based on a total bandwidth credit used by the bandwidth clients in the current credit cycle, and wherein the credit cycle is skipped if the total bandwidth credit used by the bandwidth clients in the current credit cycle is less than the lower cycle threshold.

13. The method of claim 8, wherein the bandwidth credit amounts are distributed by adding the bandwidth credit amounts to the bandwidth credit balances for the active clients.

14. The method of claim 8, wherein the bandwidth credit amounts are equal to zero for the active clients having the bandwidth credit balances greater than an upper client threshold.

15. A non-transitory computer-readable storage medium storing instructions that, if executed by a processor of a system, cause the processor to:
 determine whether to refresh a credit cycle for bandwidth on a network based on a plurality of bandwidth credit balances corresponding to a plurality of bandwidth clients of the network, wherein the credit cycle is refreshed if each of the bandwidth credit balances is less than a lower cycle threshold;
 in response to determining that an amount of unused bandwidth credit in the current credit cycle is greater than a bandwidth capacity of the network, skip the refresh of the credit cycle;
 select one or more active clients of the bandwidth clients, wherein the active clients comprise one or more of the bandwidth clients that use an amount of bandwidth credit in a current credit cycle that exceeds a lower client threshold; and distribute one or more bandwidth credit amounts to the active clients in response to the credit cycle being refreshed.

16. The non-transitory computer-readable storage medium of claim 15, wherein the instructions cause the processor to determine whether to skip the credit cycle based on the bandwidth credit balances, wherein the credit cycle is skipped if each of the bandwidth credit balances is greater than an upper cycle threshold.

17. The non-transitory computer-readable storage medium of claim 15, wherein the instructions cause the processor to determine whether to skip the credit cycle based on the amount of unused bandwidth credit in the current credit cycle and the bandwidth capacity of the network.

18. The non-transitory computer-readable storage medium of claim 17, wherein the instructions cause the processor to determine a sum of the amount of unused bandwidth credit in the current credit cycle and an amount of unused bandwidth in one or more previous credit cycles, and wherein the credit cycle is skipped if the sum is greater than the bandwidth capacity of the network.

19. The non-transitory computer-readable storage medium of claim 15, wherein the instructions cause the processor to determine whether to skip the credit cycle based on a total bandwidth credit used by the bandwidth clients in the current credit cycle, and wherein the credit cycle is skipped if the total bandwidth credit used by the bandwidth clients in the current credit cycle is less than the lower cycle threshold.

20. The non-transitory computer-readable storage medium of claim 15, wherein the bandwidth credit amounts are distributed by adding the bandwidth credit amounts to the bandwidth credit balances for the active clients.

* * * * *